Dec. 17, 1929.  G. W. BLAIR  1,739,500
AUTOMATIC FASTENER
Filed July 17, 1925
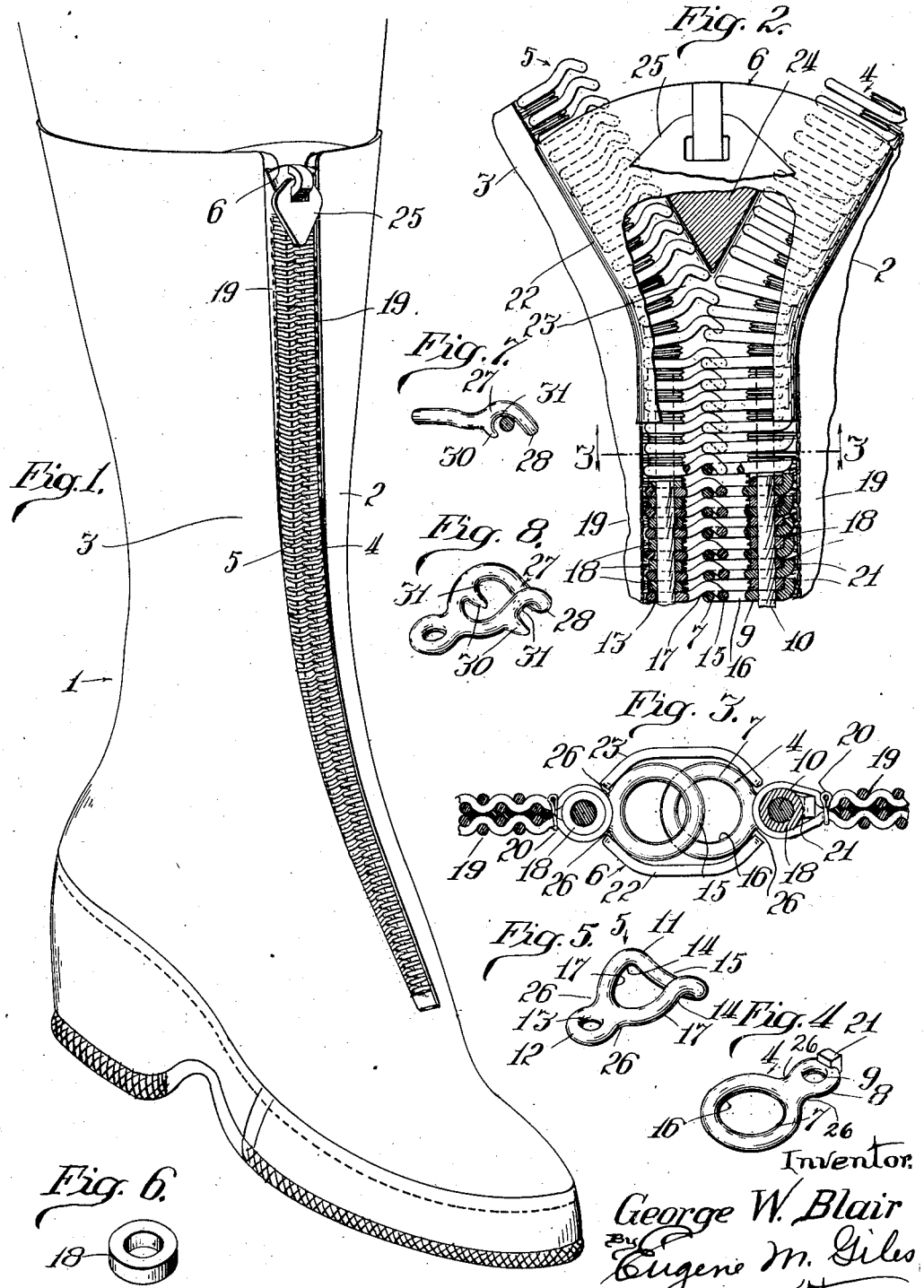
Inventor.
George W. Blair
By Eugene M. Giles
Attorney.

Patented Dec. 17, 1929

1,739,500

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

AUTOMATIC FASTENER

Application filed July 17, 1925. Serial No. 44,158.

My invention relates to fasteners of the type wherein each of the parts which are to be connected has a series of fastener elements thereon which are adapted to be interlocked with and released from the other series of fastener elements by movement of a cam member or slider therealong.

In many cases in which fasteners of this character are used, for example in footwear, the fastener must be quite flexible. The fastener elements, therefore, must not only interengage in a manner to afford flexibility but they must also be interlocked securely so that they will not come apart in bending and twisting movements of the fastener. Furthermore, the fastener elements, which are preferably small, must be securely attached to and accurately spaced on the parts which they connect, and it is desirable that the attaching and spacing be accomplished in a simple and convenient manner and in a small, compact form so as to afford a neat appearance.

The principal objects of my invention are to provide an improved fastener of the type above referred to; to afford a high degree of flexibility; to utilize separate elements of an improved form; to assemble and mount the elements in an improved manner; to insure a positive and substantial mounting of the elements; to prevent release of the elements when the fastener is subjected to bending and twisting strains; to provide a convenient means for spacing the elements; to space the elements in such a manner that it does not interfere with the flexibility of the fastener; and in general to provide a simple and dependable fastener of the slider operated type which may be conveniently manufactured and assembled.

On the drawings, Fig. 1 is a perspective view of an overshoe with my improved fastener;

Fig. 2 is an enlarged fragmentary front view of the fastener at the point of interlocking and showing adjoining portions of the fastener members in the interlocked and released positions;

Fig. 3 is an enlarged sectional view on the line 3—3 of Fig. 2;

Figs. 4 and 5 are perspective views respectively of the fastener elements composing my fastener;

Fig. 6 is a perspective view of the spacer; and

Figs. 7 and 8 are side and perspective views respectively of a modified form of fastener element.

I have shown and described my fastener in connection with an overshoe of the type which is commonly worn by women although it is to be understood that the fastener is not limited to such use but is capable of and intended to be used in connection with any article wherein a slider operated fastening device is desired. The overshoe as a whole is indicated by the reference numeral 1, and is divided down the front to afford separable side portions 2 and 3 which have, on their forward edges, the series of fastener elements 4 and 5 respectively which are coupled together or interlocked and uncoupled or released by the movement of the slider 6 therealong.

The fastener elements are represented herein as punched or stamped parts, merely for the purpose of illustration, as it is contemplated that they may be made in any other convenient manner. The elements 4 are somewhat in the form of a figure 8, comprising an interlocking portion 7, substantially in the form of a loop, having an eyelet or smaller loop 8 on the edge with an aperture 9 through which a cord 10 or other flexible stringer is inserted for assembling the elements in series. The elements 5 are of a similar shape having the interlocking loop 11 and the eyelet or small loop 12 with an aperture 13 to receive a cord or flexible member 10 on which the elements are assembled. The loop portion 11 of the element 5, however, instead of being a flat loop, such as the loop 7 of the element 4, is bent along a transverse line, as shown particularly in Figs. 2 and 5, so as to form a recess or seat 14 at each side with a downwardly extending end 15 so that this end will engage in the opening 16 of the loop 7 of the fastener element 4, and spaced marginal portions of the loop 7 will, at the same time, be engaged in the seats 14 of the element 5. The portion of the loop 11 at the attaching side of the seats 14 is inclined downwardly and the attaching loop 12 arranged at an angle to said portion, as shown, so as to afford shoulders 17 at the side of the seats 14 remote from the downturned end 15, which shoulders serve to prevent shifting or displacement of the loop 7 from the seats 14 and insures an interlocking engagement which cannot be released except by operation of the slider.

It is important that the fastener elements must be accurately spaced apart and at the same time mounted in a flexible manner so that the article in connection with which they are used may be bent or twisted as required, and the elements 4 and 5 are therefore strung upon cords or flexible members 10, preferably with a small ring or spacer 18 of a yielding material such as rubber therebetween which serves to afford the proper spacing and at the same time permits a high degree of flexibility.

The series of fastener elements may be mounted on or attached in any convenient manner to the parts which are to be connected thereby, for example in the illustrated structure a tape 19 has longitudinal threads omitted substantially midway between the lateral edges and the cross threads at the center of the strip of tape are passed between the elements 4 or 5 and folded around the stringer 10 and spacers 18, as shown particularly in Fig. 3. The two side portions of the tape may then be sewed together as at 20 close up to the stringer 10 or the side portions may be secured together by a cementitious substance, and the tape then secured to the side portions 2 or 3 of the overshoe or such parts as it may be desired to connect by means of the fastener.

Another means for spacing the elements is shown in connection with the elements 4 of Figs. 2, 3 and 4 and comprises an upturned lug 21 at the rear end of the element on the loop portion 8 and adapted to contact with the loop portion 8 of the next adjoining element when the elements are assembled on the stringer 10.

The cam member or slider 6 is of substantially the usual form comprising front and rear plates 22 and 23 respectively, which are flared at their upper ends and secured together with a wedge shaped member 24 therebetween, and provided on the front with a finger grip 25 for conveniently manipulating the slider. The lateral edges of these plates 22 and 23 are turned inwardly so as to engage the rear inwardly curving portions of the loops 7 and 10 of the elements 4 and 5, these elements being formed with recesses 26 at each side between the large and small loop portions forming a somewhat narrow neck therebetween and permitting a substantial engagement of the inturned edges of the plates 22 and 23 with the loop portions 7 and 10 of the elements 4 and 5 respectively. The inturned edges of the plates 22 and 23, together with the wedge shaped member 24 form substantially divergent channels which merge into a single channel at the lower end of the slider and serve upon movement of the slider in one direction to spread apart and uncouple or release the elements 4 and 5 from engagement with one another and upon movement in the other direction to bring the elements 4 and 5 together and couple or interlock same. It will be observed that as the slider 6 moves along the opposed series of elements 4 and 5 a bend occurs in each series of fastener elements whereby the inner extremities of the adjoining elements of each series are spread apart sufficiently so that the inner ends of the elements of one series may be inserted between or withdrawn from between the adjoining elements of the other series, the rounded surfaces of the loop portions 7 and 10 serving at such time to properly guide the elements to the interlocking position.

It is important that the plain loops 7 of the fastener elements should be confined in the seats 14 against shifting toward the attaching ends of its elements 5 as such freedom of movement permits the interlocking elements to be pulled apart or separated without the use of the slider. It is for the purpose of avoiding such shifting of the plain elements and possible disengagement of the fasteners that I have formed the element 5 with the seats 14 which not only have the down turned end 15 at one side but at the other side have the downwardly extending shoulder portions 17 which serve to hold the loop 7 of the plain element 4 in the seats.

Instead of forming the elements 5 as shown in Figs. 2 and 5 with the shoulders 17, they may be constructed as shown in Figs. 7 and 8 with the loop portion 27 having the down turned end 28 and with downwardly extending projections or fingers 30 at the rear of the seats 31 for confining the loop 7 in the seats.

With my present fastening device, inasmuch as the elements are separate and merely joined together by a cord or flexible stringer 10 with yielding spacers therebetween, the fastener is capable of extreme flexibility without strain upon or injury to the fastening device, and moreover in view of the positive confining of the interlocking portions of the elements of one series, against displacement in the seats of the elements of the other series, the fastener elements remain securely interlocked under all conditions and cannot be released except through the releasing operation of the cam member or slider. The construction of the elements with the small loops or eyes through which the stringer is threaded for assembling the elements not only affords a convenient means for mounting the elements but also insures a positive attachment of the elements.

While I have shown and described my invention in a preferred form, I am aware that various changes and modifications may be made without departing from the principles of my invention, and I therefore do not propose to limit the patent granted hereon otherwise than necessitated by the prior art.

I claim:

1. In a fastener of the class described, the combination of two interlocking series of fastener elements each element having a mounting loop at the side, stringers passing through the mounting loops of the fastener elements, and closed spacer loops on the stringers between the mounting loops of the adjoining elements.

2. In a fastening device of the class described, the combination of two interlocking series of fastener elements, a stringer for each series, and a series of closed loops on each stringer for mounting and spacing the elements.

3. In a fastener of the class described, the combination of a plurality of fastening elements each having a laterally disposed attaching portion, a stringer engaged through the attaching portions for mounting the elements and a resilient spacer on the stringer between the adjoining fastener elements.

4. In a fastener of the class described, the combination of opposed series of fastener elements wherein the elements of one series comprise axially aligned fastener loops spaced apart to receive the fastener elements of the other series therebetween and having portions at their corresponding sides offset toward the next adjoining loop to lock the fastener elements of the other series between said fastener loops, another series of smaller loops extending laterally from the fastener loops at the side opposite from the said offset portions, flexible mounting means for the series of fastener loops having a flexible strand extending through said series of smaller loops, and a slider operable along the opposed series of fastener elements for interlocking and releasing same.

5. In a fastener of the class described the combination of opposed series of fastener elements wherein the elements of one series comprise superposed wirelike loops with a series of mounting eyelets at one side thereof, said wire-like loops being spaced apart to receive the elements of the other series therebetween and having portions at the side remote from said eyelets offset in the direction of the length of the series of loops to lock the elements of the other series therebetween, a flexible support having said series of eyelets connected therewith for mounting the series of fastener loops, and a slider operable along the opposed series of fastener elements for interlocking and releasing same.

6. In a fastener of the class described, the combination of opposed series of fastener loops wherein the loops of each series are spaced apart to receive the loops of the other series therebetween, a flexible support for each series of loops comprising a tape folded around a strand, a series of mounting loops at the side of the series of fastener loops and engaged on the strand for securing the fastener loops to the flexible support, one of said series of fastener loops having a portion of each loop at the side opposite the mounting loops offset in the direction of the length of the series of fastener loops to interlock with the loops of the opposed series, and a slider operable along the two series of fastener loops for interlocking and releasing same.

GEORGE W. BLAIR.